United States Patent
Iwasaki

(10) Patent No.: US 8,107,727 B2
(45) Date of Patent: Jan. 31, 2012

(54) DOCUMENT PROCESSING APPARATUS, DOCUMENT PROCESSING METHOD, AND COMPUTER PROGRAM PRODUCT

(75) Inventor: Masajiro Iwasaki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 671 days.

(21) Appl. No.: 12/245,851

(22) Filed: Oct. 6, 2008

(65) Prior Publication Data
US 2009/0123071 A1    May 14, 2009

(30) Foreign Application Priority Data

Nov. 12, 2007  (JP) ................. 2007-293394

(51) Int. Cl.
 *G06K 9/34* (2006.01)
(52) U.S. Cl. ...................... 382/173; 382/176
(58) Field of Classification Search .............. 382/173, 382/176, 180
See application file for complete search history.

(56) References Cited

U.S. PATENT DOCUMENTS

| | | | | |
|---|---|---|---|---|
| 5,848,186 | A * | 12/1998 | Wang et al. | 382/176 |
| 6,327,387 | B1 * | 12/2001 | Naoi et al. | 382/190 |
| 2001/0043740 | A1 * | 11/2001 | Ichikawa et al. | 382/176 |
| 2007/0065045 | A1 | 3/2007 | Iwasaki | |
| 2007/0171473 | A1 | 7/2007 | Iwasaki | |
| 2007/0171482 | A1 | 7/2007 | Iwasaki | |

FOREIGN PATENT DOCUMENTS

| | | |
|---|---|---|
| JP | 2003-091525 | 3/2003 |
| JP | 3696915 | 7/2005 |
| JP | 2007-200014 | 8/2007 |
| JP | 2007-286961 | 11/2007 |

OTHER PUBLICATIONS

Office Action issued Oct. 25, 2011 in Japanese Patent Application No. 2007-293394 filed Nov. 12, 2007.

* cited by examiner

*Primary Examiner* — Phuoc Tran
(74) *Attorney, Agent, or Firm* — Oblon, Spivak, McClelland, Maier & Neustadt, L.L.P.

(57) ABSTRACT

In a document processing apparatus, a first character information extracting unit extracts, for a first area that is an area determined to be a character extractable area in divided areas of a document information, first character information from the area; a second character information extracting unit extracts, for a second area that is an area not determined to be the character extractable area in the divided areas, a character code by performing a character recognition processing on a document image generated from the document information as second character information; and a storing unit stores therein the first character information, the second character information, and at least one of the document information and the document image in association with each other.

16 Claims, 7 Drawing Sheets

FIG. 2

| DOCUMENT ID | TITLE | CREATION/ UPDATE DATE | NUMBER OF PAGES | FILE FORMAT | FILE PATH | FILE NAME |
|---|---|---|---|---|---|---|
| DOC0001 | ABOUT IMAGE | 2005/11/19 | 22 | doc | /doc/image.doc | image.doc |
| DOC0002 | HOW TO WRITE DOCUMENT | 2007/1/14 | 4 | tiff | /doc/doc.tiff | doc.tiff |
| .. | .. | .. | .. | .. | .. | .. |

FIG. 3

| PAGE ID | DOCUMENT ID | PAGE NO. | IMAGE DATA PATH |
|---|---|---|---|
| P000001 | DOC0001 | 1 | ...... |
| : | : | : | : |

FIG. 4

| AREA ID | DOCUMENT ID | PAGE ID | AREA COORDINATES | TYPE | TITLE | TEXT |
|---|---|---|---|---|---|---|
| R000001 | DOC0001 | P000001 | (0, 0)-(500, 200) | TEXT | IMAGE | NOW··· |
| : | : | : | : | : | : | : |

FIG. 5

| DOCUMENT ID | PAGE ID | AREA ID | CHARACTER INFORMATION | START POSITIONAL COORDINATES | CHARACTER SPACE | LINE SPACE | CHARACTER ALIGNMENT | CHARACTER DIRECTION | FONT SIZE |
|---|---|---|---|---|---|---|---|---|---|
| DOC0001 | P000001 | R000001 | NOW······ | 10, 15 | 0 | 4 | LEFT-ALIGNMENT | VERTICAL | 21p |
| DOC0002 | P002001 | R002001 | AUTUMN | 30, 20 | - | - | - | - | 21p |
| ·· | ·· | ·· | ·· | ·· | ·· | ·· | ·· | ·· | ·· |

DOCUMENT PROCESSING APPARATUS, DOCUMENT PROCESSING METHOD, AND COMPUTER PROGRAM PRODUCT

CROSS-REFERENCE TO RELATED APPLICATIONS

The present application claims priority to and incorporates by reference the entire contents of Japanese priority document 2007-293394 filed in Japan on Nov. 12, 2007.

BACKGROUND OF THE INVENTION

1. Field of the Invention

The present invention relates to an apparatus, a method, and a computer program product for processing a document.

2. Description of the Related Art

With recent improvement of the computer-related technology and the network environment, electronic documents have been widely used, so that conventional paper sheets are less used at offices.

With increasing use of electronic documents, there is a demand for a technology that enables collective management of electronic document data for searching.

Japanese Patent Application Laid-open No. 8-212331 discloses a technology in which text information (character code) is extracted from a drawing code used for generating document image data, and the extracted text information and the document image data are associated with each other. Because the document image data is generated from the drawing code, the drawing code is deemed to be intermediate data including the character code and the like. Therefore, the character code is easily extracted from the drawing code.

Document data often includes drawings or tables that are embedded as, for example, image data. Moreover, characters are often inserted as images in a case of a web page described in hypertext markup language (HTML) for placing an emphasis on visual effects.

However, because the technology disclosed in Japanese Patent Application Laid-open No. H8-212331 employs an extraction of a character code from a drawing code, if image data representing drawings and tables is embedded in the drawing code, the image data cannot be extracted.

On the other hand, when image data is extracted from drawings or tables by performing character recognition processing on document image data generated from document data, a character is hard to be extracted accurately.

SUMMARY OF THE INVENTION

It is an object of the present invention to at least partially solve the problems in the conventional technology.

According to an aspect of the present invention, there is provided a document processing apparatus including a document information obtaining unit that obtains document information created using at least two applications; an image generating unit that generates a document image based on the document information; an area dividing unit that divides the document information into areas for each of the applications; a determining unit that determines whether a divided area is a character extractable area from which a character code can be extracted, for each of the areas; a first character information extracting unit that extracts, for a first area that is an area determined to be the character extractable area, first character information from the area; a second character information extracting unit that extracts, for a second area that is an area not determined to be the character extractable area, a character code by performing a character recognition processing on the document image as second character information; and a storing unit that stores therein the first character information, the second character information, and at least one of the document information and the document image in association with each other.

Furthermore, according to another aspect of the present invention, there is provided a method of processing a document including obtaining document information created using at least two applications; generating a document image based on the document information; dividing the document information into areas for each of the applications; determining whether a divided area is a character extractable area from which a character code can be extracted, for each of the areas; first extracting including extracting, for a first area that is an area determined to be the character extractable area, first character information from the area; second extracting including extracting, for a second area that is an area not determined to be the character extractable area, a character code by performing a character recognition processing on the document image as second character information; and storing therein the first character information, the second character information, and at least one of the document information and the document image in association with each other.

Moreover, according to still another aspect of the present invention, there is provided a computer program product comprising a computer-usable medium having computer-readable program codes embodied in the medium that when executed cause a computer to execute the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a schematic diagram of a data structure of a document management table;

FIG. 3 is a schematic diagram of a data structure of a page management table;

FIG. 4 is a schematic diagram of a data structure of an area management table;

FIG. 5 is a schematic diagram of a data structure of a text management table;

DETAILED DESCRIPTION OF THE PREFERRED EMBODIMENTS

Exemplary embodiments of the present invention are explained in detail below with reference to the accompanying drawings.

Figure 1:
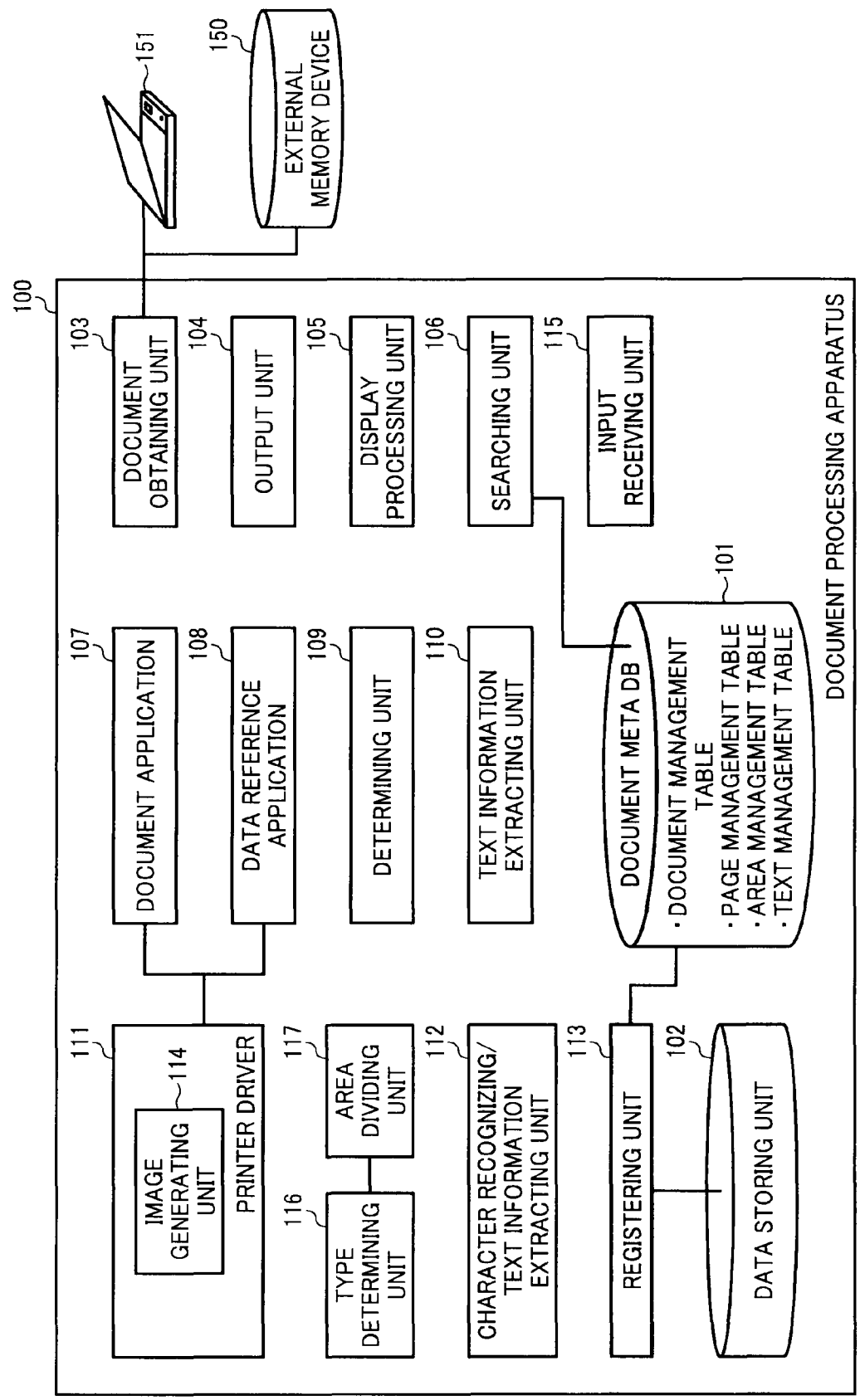
FIG. 1 is a block diagram of a configuration of a document processing apparatus according to an embodiment of the present invention.

FIG. 1 is a block diagram of a configuration of a document processing apparatus 100 according to a first embodiment. As shown in FIG. 1, the document processing apparatus 100 has therein a document meta database (DB) 101, a data storing unit 102, a document obtaining unit 103, an output unit 104, a display processing unit 105, a searching unit 106, a document application 107, a data reference application 108, a determining unit 109, a text information extracting unit 110, a printer driver 111, a character recognizing/text information extracting unit 112, a registering unit 113, an input receiving unit 115, a type determining unit 116, and an area dividing unit 117. The document processing apparatus 100 obtains and analyzes document data, and manages the document data. The document processing apparatus 100 is capable of performing a search on the document data.

The document data includes an electronic document including a character code and the like created by an application, and document image data representing an image of each page. Examples of the document image data include data read in by a scanner from a paper document. The document data according to the present invention includes in particular those including image data and objects, in other words, data created by a plurality of applications such as a document creation application (for example, the document application 107), and either one or both of an image creation application and a table creation application.

The data storing unit 102 stores therein the obtained document data and a page image data generated from the document data. The detailed information about the document data is managed by the document meta DB 101.

The document meta DB 101 has a document management table, a page management table, an area management table, and a text management table.

FIG. 2 is a schematic diagram of a data structure of the document management table. As shown in FIG. 2, the document management table stores therein a document ID, a title, a creation/update date, the number of pages, a file format, a file path, and a file name in association with each other.

The document ID is unique to document data, and make it possible to specify document data. The tile is a title of document data. The creation/update date shows the creation date or the last update date of document data. The number of pages shows the number of pages of document data. The file format shows a format of document data. The file format makes it possible to specify what the format of the managed document data is, among an electronic document created by an application, a Web page, a document image data, or the like.

The file path shows a location where the document data is stored. The file name shows a file name of the document data.

FIG. 3 is a schematic diagram of a data structure of the page management table. As shown in FIG. 3, the page management table stores therein a page ID, a document ID, a page number, and a page image data path in association with each other. Each field will be explained below.

The page ID is unique to each page constituting document data, and makes it possible to specify a page of the document data uniquely. The document ID is an ID for specifying the document data including the pages. The page number is a page number of the page in the document data including the page. The page image data path shows a location where the page image data representing the page is stored.

FIG. 4 is a schematic diagram of a data structure of the area management table. As shown in FIG. 4, the area management table stores therein an area ID, a document ID, a page ID, area coordinates, a type, a title, and a text in association with each other. Each field will be explained below.

The area ID is an ID unique to each area obtained by dividing a page included in document data, and makes it possible to specify an area included in each page of the document data. The document ID and the page ID are IDs for specifying document data and page including the area. The area coordinates show coordinates for specifying the area, and includes upper left apex coordinates and lower left apex coordinates to specify the area in the present embodiment.

The type in the area management table shows information for specifying a type of data of the area. Types of data include a text, an image (including image data created by an image creation application), a drawing (including objects created by a drawing creation application such as an organizational chart, a flowchart, and a Gantt chart), a picture, a table (including objects created by a table creation application), and a graph (including objects created by a table calculation application such as a circular chart, and a bar chart). These types are document constituent elements constituting document data.

The title shows a title indicating the area. The text shows text information included in the area. The text information includes not only that of a text of the area, but also that extracted by performing character recognition processing on images. The area including a character string can be specified by performing a search on the field with the character string as a search key.

FIG. 5 is a schematic diagram of a data structure of the text management table. As shown in FIG. 5, the text management table stores therein a document ID, a page ID, an area ID, character information, start positional coordinates, a character space, a line space, character alignment, a character direction, and a font size in association with each other. A text being managed, the area including the text, the page including the area, and the document including the page can be specified by the document ID, the page ID, and the area ID. The character information stores therein one or more character codes extracted from the area. The start positional coordinates represent positional coordinates of a character code extracted from the extracted area (for example, upper left apex coordinates). The font size is a font size of the extracted character code.

The data storing unit 102 and the document meta DB 101 can be configured by any of generally used memory devices such as a hard disk drive (HDD), an optical disk, a memory card, and a random access memory (RAM).

Figure 6:
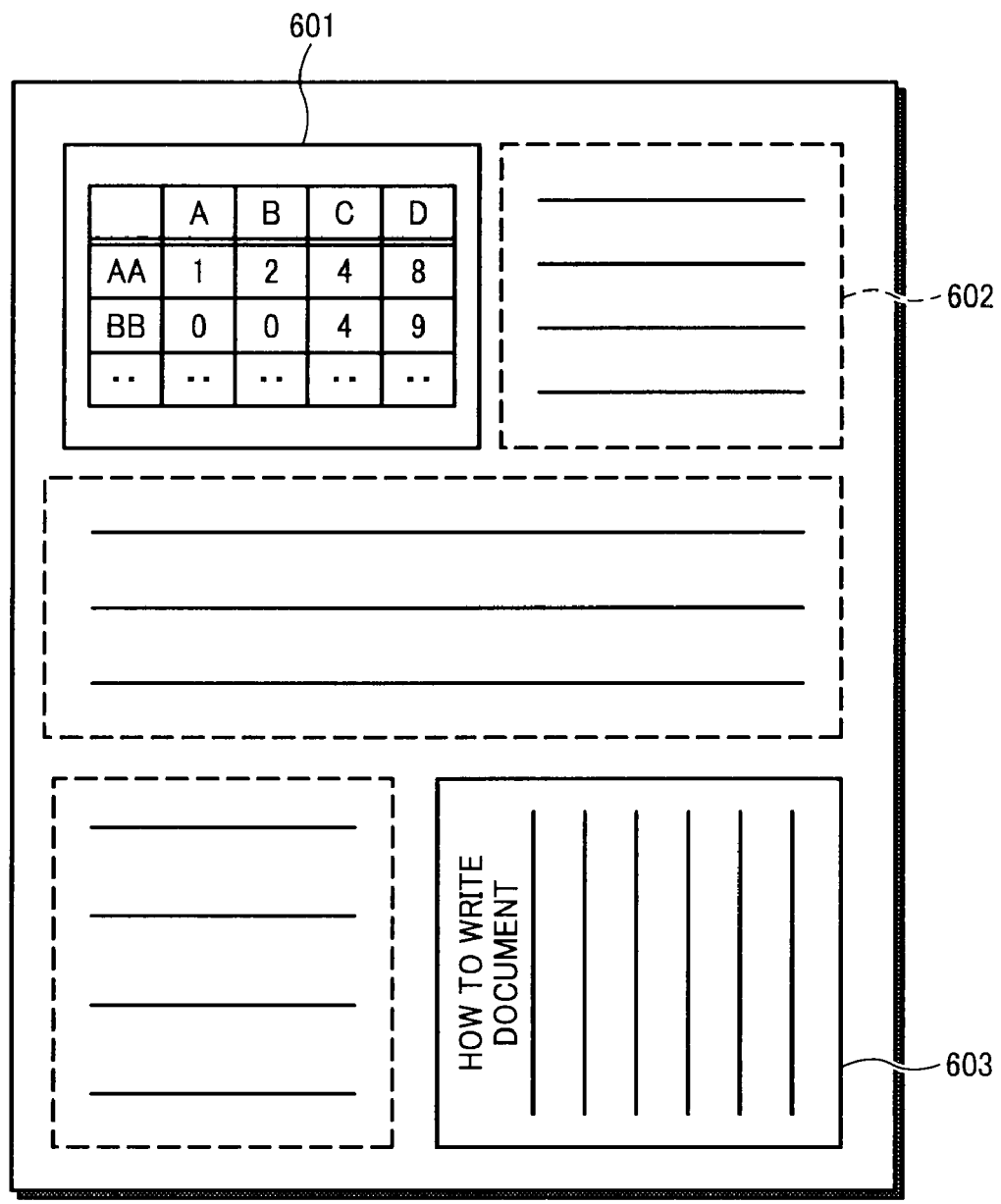
FIG. 6 is a schematic diagram for explaining document data to be processed.

The document obtaining unit 103 obtains document data. FIG. 6 is a schematic diagram for explaining document data to be processed in the present embodiment. As shown in FIG. 6, the document data includes a table 601 as image data, and a vertically written text 603 as image data. The table 601 and the text 603 are treated as separate areas in the document processing apparatus 100. Specifically, image data and objects included in document data are divided according to applications that have created the image data and the objects.

Text areas separated by dashed lines, such as an area 602, are also treated as separated areas. The obtained document data is read in by calling up an application appropriate for a format or by calling up an application program interface (API) of the application. Examples of the application will be explained below.

The document application 107 is capable of reading in document data of a first format. The document application 107 is capable of performing reference and edit of document data of the first format.

The data reference application 108 is capable of reading in document data of a second format. The data reference application 108 is capable of performing reference of document data of the second format.

The document application 107 cannot recognize the document data of the second format, and the data reference application 108 cannot recognize the document data of the first format.

The printer driver 111 has an image generating unit 114, and receives output instruction of document data. In the present embodiment, when the printer driver 111 receives an output instruction, the printer driver 111 calls up the image generating unit 114, and generates page image data.

When the printer driver 111 receives an instruction to output document data, the image generating unit 114 generates page image data showing an entire display area of the document data. The image generating unit 114 according to the present embodiment generates page image data for each page of document data.

The area dividing unit 117 divides each page of document data into areas of each object and image data included in the page (for each application that has created the data), and for each paragraph or column included in the document. Any method, including a well-known method, can be used for dividing areas included in a page.

The type determining unit 116 determines types of areas constituting document data. The type determining unit 116 determines the types of the areas by extracting feature amounts from the areas as subjects of type determination, and performing pattern recognition processing based on the extracted feature amounts. Any pattern recognition method can be used, including the neural network method and the support vector machine method. By learning by using the neural network method or the support vector machine method and creating data sets for learning, highly accurate determination can be made in distinguishing areas.

The determining unit 109 determines whether each page of document data includes only image data. When the determining unit 109 determines that a page includes a document constituent element other than image data, the determining unit 109 determines, for each area constituting the page, whether the determined type is a type the character code of which is extractable. The type the character code of which is extractable includes, in addition to text elements, document constituent elements showing objects created by a table calculation application.

The text information extracting unit 110 extracts text information, or a character code group, from an area of a type the character code of which is determined to be extractable, such as text elements. In the present embodiment, as areas from which text information is extracted by the text information extracting unit 110, types the character codes of which are extractable include, in addition to text elements, data the character codes of which are extractable, for example, object data created by an application.

The character recognizing/text information extracting unit 112 performs the character recognition processing on a region corresponding to an area the type of which is determined not to be a text element by the determining unit 109, among a region of page image data generated by the image generating unit 114, and extracts the obtained character code as text information of the area. The character recognition processing is assumed to be that used in optical character recognition (OCR).

In this way, the character recognizing/text information extracting unit 112 associates areas of document data and regions of generated page image data with each other before performing the character recognition processing. Therefore, text information can be extracted from areas from which character codes cannot be extracted. The approach of associating the regions and the areas can be any approach, including a well-known approach.

In other words, in the document processing apparatus 100 according to the present embodiment, the text information extracting unit 110 extracts text information, and for areas from which the text information extracting unit 110 cannot extract text information, the character recognition processing is performed on display areas of page image data corresponding to the areas to extract text information. Therefore, all the text information included in document data can be extracted. Meanwhile, extraction of text information by the character recognition processing may cause an error. Accordingly, in the present embodiment, text information of areas from which character codes are extractable is extracted without performing the character recognition processing. Therefore, accuracy of extracting text information can be improved compared with the case where the character recognition processing is performed on the entire area of image data generated from document data to extract text information.

The registering unit 113 registers information about document data, and a page and an area of the document data in the document meta DB 101, and stores document data and image data in the data storing unit 102. Details of the registration procedure will be explained below.

The type determining unit 116, the determining unit 109, the character recognizing/text information extracting unit 112, the text information extracting unit 110, and the registering unit 113 can be a plug-in program incorporated into the document application 107 or the data reference application 108, or can be created as a separate application.

The input receiving unit 115 receives input of information from an input device (not shown). For example, the input receiving unit 115 receives a request for a document data search, and criteria of the document data search.

The searching unit 106 performs a search on the document management table, the page management table, the area management table, and the text management table in accordance with the input search criteria. Moreover, the searching unit 106 can perform a search on at least one of text information extracted by the text information extracting unit 110, and text information extracted by the character recognizing/text information extracting unit 112 by performing a search on the area management table and the text management table.

The display processing unit 105 performs display processing of arbitrary information on a display device (not shown). For example, the display processing unit 105 performs display processing of a list of page image data including text information matching search criteria, the list serving as a search result of the searching unit 106. Unlike the present embodiment, the display processing unit 105 can display document data including text information matching search criteria. Then, the input receiving unit 115 receives a selection of page image data of document data desired to be used from the list of the displayed page image data.

The output unit 104 outputs the document data including the page image data selected by a user to an application that can read in the document data (e.g., the document application 107). For example, the output unit 104 can output document data including selected image data as a page when the input receiving unit 115 receives a selection of the image data of the page subjected to processing for display by the display processing unit 105. Therefore, the user can use the selected document.

Figure 7:
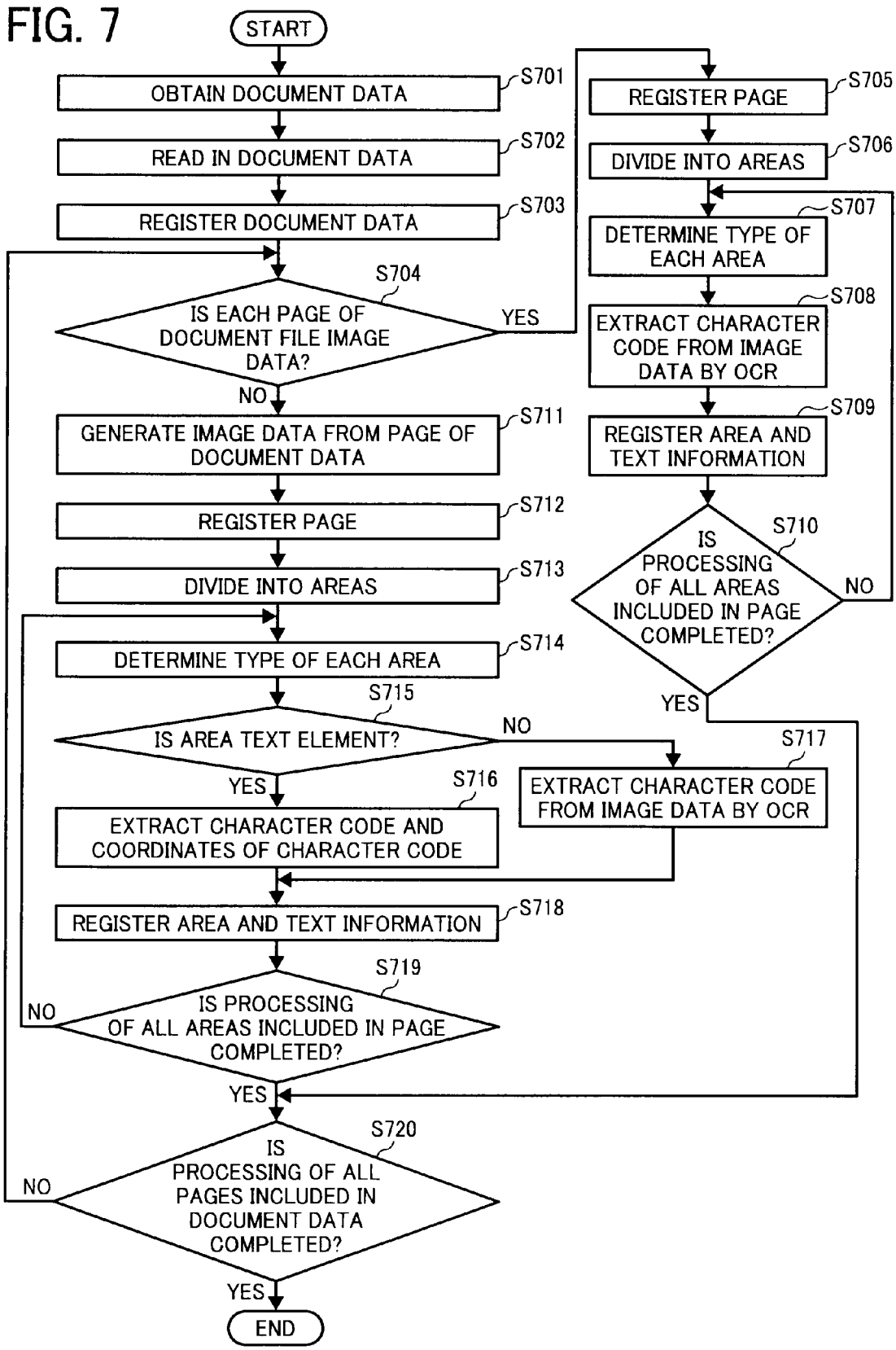
FIG. 7 is a flowchart of a procedure of document data registering processing in the document processing apparatus.

Processing (document data registering processing) from obtaining document data in the document processing apparatus 100 to registering the document data in the document meta DB 101 will now be explained. FIG. 7 is a flowchart of a procedure of the document data registering processing in the document processing apparatus 100. In FIG. 7, the processing makes full use of a generally used document image recognition technology.

First, the document obtaining unit 103 obtains document data from an external environment such as a scanner 151 or an external memory device 150 (Step S701).

Then, the document obtaining unit 103 calls up an API of an application that can recognize the obtained document data (for example, the document application 107) to read in the document data (Step S702), enabling to obtain the content of the document data.

The registering unit 113 stores the obtained document data in the data storing unit 102 and registers information about the document data in the document management table (Step S703). The information about the document data includes a title, a creation/update date, the number of pages, a file format, a file path as a storage destination of the document data, and a file name of the document data, shown in each field of the document management table. Then, the determining unit 109 determines whether the entire area of a page included in the document data is image data (Step S704). At Step S703, the determining unit 109 first makes determination about the first page, and, as the processing is repeated, the determining unit 109 makes determination about the following pages.

When the entire area of the page is determined to be image data (YES at Step S704), the registering unit 113 registers the image data representing the page and information about the page in association with each other (Step S705). The information about a page includes a document ID of a document including the page, a page number of the page, an image data path of a storage destination of an image representing the page. The registering unit 113 stores the image data representing the page in the data storing unit.

Then, the area dividing unit 117 divides the page image into areas (Step S706). Any approach can be used to divide the page image into areas, including a well known approach in which the image is divided based on the width of blank areas. By this division, area coordinates of the area can be specified.

Next, the type determining unit 116 determines a type of the divided area of the page based on a feature amount extracted from the area (Step S707). The type determining unit 116 extracts the feature amount from the area.

After the type is determined, the character recognizing/text information extracting unit 112 performs the character recognition processing on the area of image data to extract text information included in the area, that is, a character code group (Step S708). The character recognizing/text information extracting unit 112 obtains positional coordinates of each character code when extracting the character code by the character recognition processing. The character recognizing/text information extracting unit 112 obtains an appropriate font size, in addition to the positional coordinates. When a plurality of characters is recorded as a single record, a character space, a line space, character alignment, and the like are also obtained.

The registering unit 113 registers information about the area in the area management table, and registers information about a text extracted from the area in the text management table (Step S709). The information about the area can include a page ID of a page including the area, a document ID of a document including the page, area coordinates of the area, a type of the area, and a text.

When a character code is registered in the text management table, a character code extracted from the area ID (character information), start positional coordinates of the character code, and a font size, as well as the document ID of an extraction destination, the page ID, and the area ID, are registered in association with each other as the information about the text. The start positional coordinates are upper left coordinates of a rectangle including the character code. Registration in the text management table can be performed for each character, or for a plurality of character strings. In the latter case, information such as a character space, a line space, character alignment, and a character direction for specifying positional coordinates of each character string is registered in association with each other. Therefore, arrangement of characters in an area can be reproduced.

The determining unit 109 determines whether the processing of the Steps S706 to S708 is performed on all the areas included in the page (Step S710). When it is determined there is an area not subjected to the processing (NO at Step S710), the processing starts from the determination of the type of the unprocessed area (Step S707).

When the determining unit 109 determines that the processing has been performed (YES at Step S710), the system control proceeds to Step S720.

On the other hand, when the determining unit 109 determines that not the entire area in a page included in the document data is image data (NO at Step S704), the API of the application that has read in the document data issues an instruction to output the page to the printer driver 111.

The printer driver 111 follows the output instruction, and the image generating unit 114 generates image data of the page (Step S711).

The registering unit 113 registers generated image data representing the page and information about the page in the page management table in association with each other (Step S712).

The area dividing unit 117 divides the page into areas (Step S713). Any approach can be used to divide the page image into areas, including a well known approach in which the image is divided based on the width of blank areas. By this division, area coordinates of the area can be specified.

Next, the type determining unit 116 determines a type of the divided area based on a feature amount extracted from the area (Step S714).

The determining unit 109 determines whether the area is an object from which a text element or a character code can be extracted based on the determined type (Step S715).

When the determining unit 109 determines that the area is an object from which a text element or a character code can be extracted (YES at Step S714), the text information extracting unit 110 extracts text information included in the area, that is a character code and positional coordinates of the character code (Step S716). The positional coordinates of a character code are the coordinates of the position where the character code is positioned when the page including the area is printed out. The positional coordinates can be specified, for example, from a generated page image data.

On the other hand, when the determining unit 109 determines that the area is not an object from which a text element or a character code can be extracted (NO at Step S714), the character recognizing/text information extracting unit 112 performs the character recognition processing in the area of an image data, and extracts text information, or a character code group, included in the area (Step S717). The character recognizing/text information extracting unit 112, in performing the character recognition processing and extracting a character code, also obtains positional coordinates of each character code.

Thereafter, the registering unit 113 registers information about the area in the area management table, and the text information extracted from the area in the text management table (Step S718).

Then, the determining unit 109 determines whether the processing from Steps S715 to S718 has been performed on the entire area of the page (Step S719). When the determining unit 109 determines that there is an area that has not been subjected to any of the processing (NO at Step S719), the processing starts from the determination of the type of the unprocessed area (Step S714).

On the other hand, when the determining unit 109 determines that the entire area of the page has been subjected to the processing (YES at Step S719), the system control proceeds to Step S720.

Next, the determining unit 109 determines whether the processing of Steps S704 to S719 has been performed on all the pages included in document data (Step S720). When the determining unit 109 determines that not all the pages have been subjected to any of the processing (NO at Step S720), the system control returns to Step S704 to start the processing again (Step S704).

On the other hand, when the determining unit 109 determines that the processing of Steps S704 to S719 has been performed on all the pages included in the document data (YES at Step S720), the processing ends.

In the processing procedure, processing of an electronic document is explained specifically; however, the processing can be performed in a case of document image data likewise. In this case, the determination at Step S704 is always YES.

With the processing procedure, information about document data is registered in the document management table, and information about each page and each area included in the document data is registered in the page management table and the area management table. Furthermore, text information included in each area is registered in the text management table in association with the positional coordinates. Thus, the information is registered irrespective of whether the area is a text element.

In the processing procedure, text information included in the document data can be extracted easily and accurately by combined use of an image data analysis method, and a document data analysis method.

Currently, there are various formats of document data for each application. To cope with these various formats, in the present embodiment, all the image data and text information of document data are registered in the document meta DB 101, irrespective of the formats. Therefore, a search on document data can be performed irrespective of the document format.

When image data of document data is generated, the image generating unit 114 of the printer driver 111 is used. Therefore, image data of document data can be generated irrespective of the format of document data.

Figure 8:
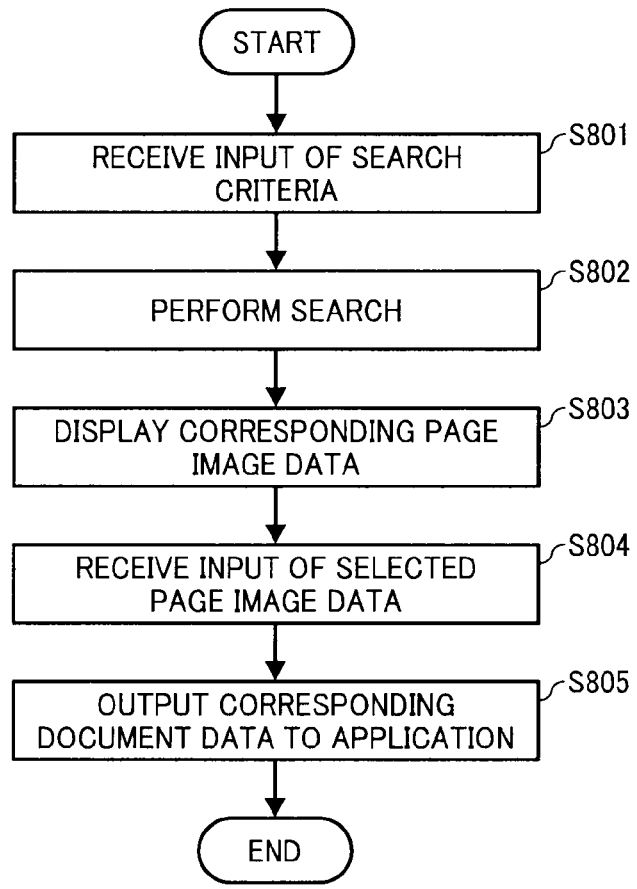
FIG. 8 is a flowchart of a procedure of document data search processing in the document processing apparatus.

Document data search processing in the document processing apparatus 100 will now be explained. FIG. 8 is a flowchart of a procedure of the document data search processing in the document processing apparatus 100.

First, the input receiving unit 115 receives input of search criteria from an input device operated by a user (Step S801).

Next, the searching unit 106 performs a search on the document meta DB 101 according to the input search criteria (Step S802). The search can be performed, for example, on a text field of an area management table, and a character information field of the text management table using a character string input by the user as a search key. Alternatively, the search can be performed by setting search criteria for the page management table or the document management table. Then, a page ID, a document ID, and the like can be specified by a detected area, text information, and the like.

The display processing unit 105 displays a list of areas satisfying the search criteria, and page image data including text information on the display device (Step S803). A page ID is associated with each page image data displayed in the list. Therefore, when the user selects the page image data, the page ID is input.

Next, the input receiving unit 115 receives input of the page ID indicating the page image data selected by the user, from the displayed list of page image data (Step S804).

The output unit 104 specifies document data including the page by the page ID indicating the page image data selected by the user, and outputs the document data to an application that can read in the document data (Step S805).

With the processing procedure, the user can use document data corresponding to search criteria. Because the search is performed on a table group of the document meta DB 101, the search can be performed without considering a format of document data.

Although, in the present embodiment, page image data matching search criteria are displayed after completion of a search, document data can be displayed instead of page image data.

There has been a problem that when image data is included in document data created by a certain application, a character string included in the image data cannot be searched. To cope with the problem, the document processing apparatus 100 according extracts image data included in document data, and registers the image data in the document meta DB 101, thereby enabling the search of the image data.

The document processing apparatus 100 changes the process of text extraction according to areas of each page of document data; therefore, analysis accuracy can be improved. In addition, by combining a common character recognition processing (e.g., OCR) and extraction of a text element of document data or a character code from an object, a simple and accurate analysis becomes possible.

Furthermore, the document processing apparatus 100 performs the character recognition processing on a drawing or a table expressed as image data of document data to extract text information. Therefore, a drawing and a table can be analyzed even when they are included to document data as image data. Furthermore, the search can be performed by text information included in the drawing or the table.

Moreover, the document processing apparatus 100 can extract text information even from document image data. In this way, the document processing apparatus 100 can perform a search on both document image data and document data.

The document processing apparatus 100 generates image data, and extracts text information from the image data to perform analysis irrespective of the format of an object included in the area.

The document processing apparatus 100 can perform a search on the document management table, the page management table, the area management table, and the text management table, which enables a search in units of document, page area, and text information.

The present invention is not limited to the present embodiment, and various modifications can be made as exemplified below.

The document processing apparatus 100 displays a list of page image data as a search result. However, what is displayed is not limited to the list of page image data.

For example, the display processing unit 105 can reproduce and display each page using information in the area management table and the text management table instead of page image data. Specifically, the display processing can reproduce a page by obtaining information in the area management table and the text management table, and arranging a character code constituting the page including the searched area at positional coordinates associated with the character code.

By the processing procedure, a page of document data can be reproduced and displayed irrespective of the format of the document data. Furthermore, because a character code, but not page image data, is used for reproducing a page, processing load on the document processing apparatus 100 can be reduced.

Figure 9:
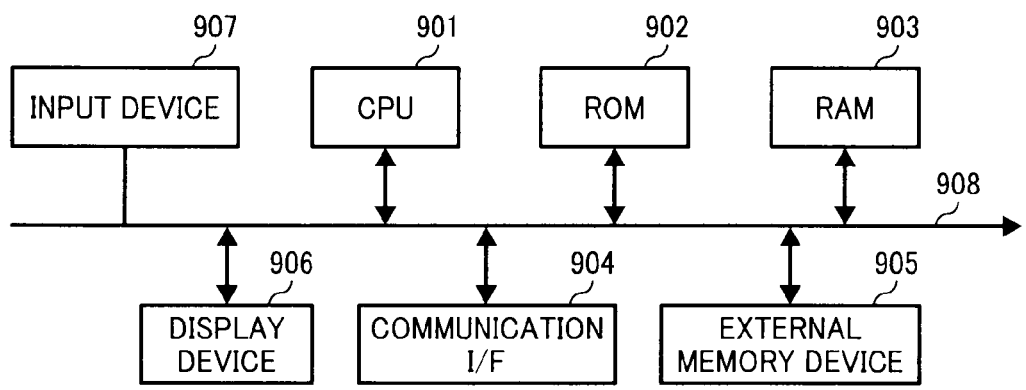
FIG. 9 is a schematic diagram of a hardware configuration of a personal computer that performs a computer program for realizing functions of the document processing apparatus.

FIG. 9 is a schematic diagram of a hardware configuration of a personal computer that performs a computer program for realizing functions of the document processing apparatus 100. The document processing apparatus 100 includes a central processing unit (CPU) 901, a read only memory (ROM) 902, a random access memory (RAM) 903, an external memory device 905 such as a hard disk drive (HDD) and a compact disk (CD) drive, a display device 906 such as a display, an input device 907 such as a keyboard and a mouse, a communication interface (I/F) 904, and a bus 908 connecting these components to have a hardware configuration using a personal computer (PC).

The document processing program performed on the document processing apparatus 100 is provided in such a way that the program is recorded as an installable format file or executable format file in a computer-readable recording medium such as a compact disk read only memory (CD-ROM), a flexible disk (FD), a compact disk recordable (CD-R), and a digital versatile disk (DVD).

The document processing program executed on the document processing apparatus 100 can be stored in a computer connected to a network such as the Internet, and downloaded through the network. Furthermore, the document processing program executed on the document processing apparatus 100 can be provided or distributed via a network such as the Internet.

Moreover, the document processing program executed on the document processing apparatus 100 can be incorporated in a memory such as the ROM 902 in advance to be provided.

The document processing program executed on the document processing apparatus 100 can be loaded on the RAM 903 by being read from the recording medium, and each of the components described above in the software configuration can be generated on the RAM 903.

According to an aspect of the present invention, character information can be extracted irrespective of an application that has created document information and accuracy of the extracted character information is improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A document processing apparatus comprising:
   a document information obtaining unit that obtains document information created using at least two applications;
   an image generating unit that generates a document image based on the document information;
   an area dividing unit that divides the document information into areas for each of the applications;
   a determining unit that determines whether a divided area is a character extractable area from which a character code can be extracted, for each of the areas;
   a first character information extracting unit that extracts, for a first area that is an area determined to be the character extractable area, first character information from the area;
   a second character information extracting unit that extracts, for a second area that is an area not determined to be the character extractable area, a character code by performing a character recognition processing on the document image as second character information; and
   a storing unit that stores therein the first character information, the second character information, and at least one of the document information and the document image in association with each other.

2. The document processing apparatus according to claim 1, further comprising:
   a searching unit that performs a search on at least one of the first character information and the second character information based on search criteria; and
   an output unit that outputs at least one of the first character information and the second character information satisfying the search criteria, and at least one of the document information and the document image associated thereto.

3. The document processing apparatus according to claim 1, wherein
   the first character information extracting unit extracts first positional information that indicates a position of the first character information; and
   the storing unit stores therein the first positional information in association with the first character information.

4. The document processing apparatus according to claim 3, wherein the output unit outputs the first character information by arranging the first character information at the first positional information.

5. The document processing apparatus according to claim 1, wherein
   the second character information extracting unit extracts second positional information that indicates a position of the second character information; and
   the storing unit stores therein the second positional information in association with the second character information.

6. The document processing apparatus according to claim 5, wherein the output unit outputs the second character information by arranging the second character information at the second positional information.

7. The document processing apparatus according to claim 1, further comprising a document-information reading application for reading in the document information, wherein
   the image generating unit generates the document image in accordance with an output instruction from the document-information reading application.

8. A method of processing a document comprising:
   obtaining document information created using at least two applications;
   generating a document image based on the document information;
   dividing the document information into areas for each of the applications;
   determining whether a divided area is a character extractable area from which a character code can be extracted, for each of the areas;
   first extracting including extracting, for a first area that is an area determined to be the character extractable area, first character information from the area;

second extracting including extracting, for a second area that is an area not determined to be the character extractable area, a character code by performing a character recognition processing on the document image as second character information; and storing the first character information, the second character information, and at least one of the document information and the document image in association with each other.

9. The method according to claim 8, further comprising:

performing a search on at least one of the first character information and the second character information based on search criteria; and outputting at least one of the first character information and the second character information satisfying the search criteria, and at least one of the document information and the document image associated thereto.

10. The method according to claim 8, wherein the first extracting includes extracting first positional information that indicates a position of the first character information; and the storing includes storing the first positional information in association with the first character information.

11. The method according to claim 10, wherein the outputting includes outputting the first character information by arranging the first character information at the first positional information.

12. The method according to claim 8, wherein the second extracting includes extracting second positional information that indicates a position of the second character information; and the storing includes storing the second positional information in association with the second character information.

13. The method according to claim 12, wherein the outputting includes outputting the second character information by arranging the second character information at the second positional information.

14. The method according to claim 8, further comprising reading in the document information, wherein the generating includes generating the document image in accordance with an output instruction at the reading.

15. A computer program product comprising a non-transitory computer-usable medium having computer-readable program codes embodied in the medium that when executed cause a computer to execute:

obtaining document information created using at least two applications;

generating a document image based on the document information;

dividing the document information into areas for each of the applications;

determining whether a divided area is a character extractable area from which a character code can be extracted, for each of the areas;

first extracting including extracting, for a first area that is an area determined to be the character extractable area, first character information from the area;

second extracting including extracting, for a second area that is an area not determined to be the character extractable area, a character code by performing a character recognition processing on the document image as second character information; and storing the first character information, the second character information, and at least one of the document information and the document image in association with each other.

16. The computer program product according to claim 15, wherein the program codes further causes the computer to execute:

performing a search on at least one of the first character information and the second character information based on search criteria; and outputting at least one of the first character information and the second character information satisfying the search criteria, and at least one of the document information and the document image associated thereto.

\* \* \* \* \*